United States Patent
da Silveira Junior

(10) Patent No.: US 12,554,539 B2
(45) Date of Patent: Feb. 17, 2026

(54) COMMAND ORCHESTRATION FOR DIGITAL TWIN MODELS

(71) Applicant: Dell Products L.P., Round Rock, TX (US)

(72) Inventor: Jaumir Valença da Silveira Junior, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 489 days.

(21) Appl. No.: 18/154,803

(22) Filed: Jan. 14, 2023

(65) Prior Publication Data

US 2024/0241753 A1 Jul. 18, 2024

(51) Int. Cl.
*G06F 9/50* (2006.01)

(52) U.S. Cl.
CPC .................. *G06F 9/5027* (2013.01)

(58) Field of Classification Search
CPC ..................................................... G06F 9/5027
See application file for complete search history.

(56) References Cited

U.S. PATENT DOCUMENTS

| | | | | |
|---|---|---|---|---|
| 12,321,153 | B2 * | 6/2025 | Miller | G06Q 10/067 |
| 2019/0005200 | A1 * | 1/2019 | Zimmerman | G16H 50/30 |
| 2019/0138970 | A1 * | 5/2019 | Deutsch | G06F 9/542 |
| 2020/0285788 | A1 * | 9/2020 | Brebner | G06F 18/251 |
| 2022/0108262 | A1 * | 4/2022 | Cella | G05B 17/02 |
| 2022/0156665 | A1 * | 5/2022 | Beth | G05D 1/0276 |
| 2022/0237532 | A1 * | 7/2022 | Phadke | G06Q 10/0637 |

FOREIGN PATENT DOCUMENTS

| | | | | |
|---|---|---|---|---|
| EP | 4120113 A1 * | 1/2023 | ......... | G06F 9/45533 |
| EP | 4184259 A1 * | 5/2023 | ............ | G05B 17/02 |
| WO | WO-2025064639 A1 * | 3/2025 | ......... | G06F 21/6254 |

OTHER PUBLICATIONS

G. Béchu, A. Beugnard, C. G. L. Cao, Q. Perez, C. Urtado and S. Vauttier, "A software engineering point of view on digital twin architecture," 2022 IEEE 27th International Conference on Emerging Technologies and Factory Automation (ETFA), Stuttgart, Germany, 2022, pp. 1-4, (Year: 2022).*
https://github.com/Azure/opendigitaltwins-dtdl/blob/master/DTDL/v2/dtdlv2.md.
https://www.techtarget.com/searchapparchitecture/definition/object-oriented-programming-OOP.
https://developer.mozilla.org/en-US/docs/Web/JavaScript/Reference/Global_Objects/Promise.
https://en.wikipedia.org/wiki/Property_(programming).
https://en.wikipedia.org/wiki/Graph_theory.
https://docs.microsoft.com/en-us/dotnet/csharp/programming-guide/concepts/async/.
https://docs.microsoft.com/en-us/dotnet/fsharp/tutorials/async.

* cited by examiner

*Primary Examiner* — Uzma Alam
(74) *Attorney, Agent, or Firm* — Workman Nydegger

(57) ABSTRACT

Command orchestration for digital twin models. Command dependencies can be expressed in definition documents using a schema. The schema pay point to a command manager digital twin configured to perform command related construction operations, command related execution operations, and command related logging operations. The command manager digital twin may also be configured to generate code from definition documents.

20 Claims, 16 Drawing Sheets

```
"@context": "dtmi:dtdl:context;2",                              "name": "cmd_c",      [3]
"@id": "dtmi:com:example:Twin_example_orchestration;1",         "schema":
"@type": "Interface",                                           {
"displayName": "Twin_example_orchestration",                      "@type": "Enum",    [4]
 "contents": [                                                    "valueSchema": "string",
 {                                        330                     "enumValues": [
  "@type": "Command",                                             {
  "@id": "dtmi:com:example:cmd_a;1",                               "name": "cmd_a",   [5]
  "name": "cmd_a"                                                  "enumValue": "1"
 },                                                              }
 {                                                               {
  "@type": "Command",                                             "name": "cmd_b",   [6]
  "name": "cmd_b",                                                "enumValue": "2"
  "@id": "dtmi:com:example:cmd_b;1"                              }
 },                                                                              332
 {                                                              ]
  "@type": "Command",                                           }
  "name": "cmd_c",                                             },
  "@id": "dtmi:com:example:cmd_c;1"                            {
 },                                                             "@type": "Property",
 {                                                              "name": "cmd_f",    [7]
  "@type": "Command",                              326           "schema":
  "name": "cmd_d",                                               {
  "@id": "dtmi:com:example:cmd_d;1"                               "@type": "Enum",
 },                                                               "valueSchema": "string",
 {                                                                "enumValues": [
  "@type": "Command",                                              {
  "name": "cmd_e",                                                  "name": "cmd_e",  [8]
  "@id": "dtmi:com:example:cmd_e;1"                                 "enumValue": "1_FANOUT"
 },                                               328            }
 {                                                              ]
  "@type": "Command",                                           }
  "name": "cmd_f",                      322                   },                          334
  "@id": "dtmi:com:example:cmd_f;1"                           {
 },                                                            "@type": "Property",
                                                               "name": "cmd_e",     [9]
 {                                                             "schema":
  "@type": "Relationship",                                     {
  "name": "IsOrchestratedBy",    [1]                            "@type": "Enum",
  "target": "dtmi:com:example:Cmd_orchestrator;1",  [2]         "valueSchema": "string",
  "properties": [                              324              "enumValues": [
   {                                                             {
    "@type": "Property",                                          "name": "cmd_d",  [10]
                                                                  "enumValue": "1_FANIN"
                                                                 }
                                                                                    320
```

Figure 3B

```
{
  "@context": "dtmi:dtdl:context;2",
  "@id": "dtmi:com:example:Cmd_orchestrator;1",
  "@type": "Interface",
  "displayName": "Cmd_orchestrator", "schemas": [

{
    "@id": "dtmi:com:example:Cmd_orchestrator:WorkflowState;1",
    "@type": "Enum",
    "valueSchema": "integer",
    "enumValues": [
     {
      "name": "Disabled",
      "enumValue": 0
     },
     {
      "name": "Running",
      "enumValue": 1
     },
     {
      "name": "Finished",
      "enumValue": 2
     },
     {
      "name": "Ready",
      "enumValue": 3
     }
    ]
   },
   {
    "@id": "dtmi:com:example:Cmd_orchestrator:CommandState;1",
    "@type": "Enum",
    "valueSchema": "integer",
    "enumValues": [
     {
      "name": "Disabled",
      "enumValue": 0
     },
     {
      "name": "Running",
      "enumValue": 1
     },
```

Figure 7A

```
      {
        "name": "Finished",
        "enumValue": 2
      },
      {
        "name": "Ready",
        "enumValue": 3
      }
    ]
  },
  {
    "@id": "dtmi:com:example:Cmd_orchestrator:Workflow;1",
    "@type": "Object",
    "fields": [
      {
        "name": "workflow_ID",
        "schema": "string"
      }
      {
        "name": "state",
        "schema": "dtmi:com:example:Cmd_orchestrator:WorkflowState;1"
      }
    ]
  },
  {
    "@id": "dtmi:com:example:Cmd_orchestrator:WorkflowList;1",
    "@type": "Array",
    "elementSchema": "dtmi:com:example:Cmd_orchestrator:Workflow;1"
  },
  {
    "@id": "dtmi:com:example:Cmd_orchestrator:Command;1",
    "@type": "Object",
    "fields": [
      {
        "name": "command_ID",
        "schema": "string"
      }
      {
        "name": "state",
        "schema": "dtmi:com:example:Cmd_orchestrator:CommandState;1"
      }
    ]
  },
  {
```

Figure 7B

```
"@id": "dtmi:com:example:Cmd_orchestrator:LogRepository;1",
"@type": "Object",
"fields": [
  {
    "name": "logRepository_ID",
    "schema": "string"
  }
]
},
{
"@type": "Object",
"@id": "dtmi:com:example:Cmd_orchestrator:LogEntry;1",
"fields": [
  {
    "name": "workflow_ID",
    "schema": "string"
  },
  {
    "name": "command_ID",
    "schema": "string"
  },
  {
    "name": "timestamp",
    "schema": "dateTime"
  }
  {
    "name": "description",
    "schema": "multiLineString"
  }
 ]
},
{
"@id": "dtmi:com:example:Cmd_orchestrator:LogEntryList;1",
"@type": "Array",
"elementSchema": "dtmi:com:example:Cmd_orchestrator:LogEntry;1"
}
], "contents": [

{
"@type": "Command",
"name": "CreateAllWorkflowsFromModel",
"request": {
```

Figure 7C

```
    "name": "pathToFolder",
    "schema": "string"
   },
   "response": {
    "name": "WorkflowList",
    "schema": "dtmi:com:example:Cmd_orchestrator:WorkflowList;1"
   }
  },
  {
   "@type": "Command",
   "name": "SerializeAllWorkflows",
   "request": {
    "name": "pathToFolder",
    "schema": "string"
   }
  },
  {
   "@type": "Command",
   "name": "LoadAllWorkflows",
   "request": {
    "name": "pathToFolder",
    "schema": "string"
   },
   "response": {
    "name": "WorkflowList",
    "schema": "dtmi:com:example:Cmd_orchestrator:WorkflowList;1"
   }
  },
  {
   "@type": "Command",
   "name": "GetWorkflow",
   "request": {
    "name": "workflow_ID",
    "schema": "string"
   },
   "response": {
    "name": "Workflow",
    "schema": "dtmi:com:example:Cmd_orchestrator:Workflow;1"
   }
  },
  {
   "@type": "Command",
   "name": "StartWorkflow",
   "request": {
```

Figure 7D

```
    "name": "workflow_ID",
    "schema": "string"
   }
  ]
 },
 {
  "@type": "Command",
  "name": "StopWorkflow",
  "request": {
   "name": "workflow_ID",
   "schema": "string"
  }
 },
 {
  "@type": "Command",
  "name": "ResetWorkflow",
  "request": {
   "name": "workflow_ID",
   "schema": "string"
  }
 },
 {
  "@type": "Command",
  "name": "GetWorkflowState",
  "request": {
   "name": "workflow_ID",
   "schema": "string"
  },
  "response": {
   "name": "Workflow",
   "schema": "dtmi:com:example:Cmd_orchestrator:WorkflowState;1"
  }
 },
 {
  "@type": "Command",
  "name": "GetCommandState",
  "request": {
   "name": "inputParams",
   "schema": {
    "@type": "Object",
    "fields": [
     {
      "name": "workflow_ID",
      "schema": "string"
     },
```

Figure 7E

```
        {
          "name": "command_ID",
          "schema": "string"
        }
       ]
      }
    },
    "response": {
      "name": "Workflow",
      "schema": "dtmi:com:example:Cmd_orchestrator:WorkflowState;1"
    }
   },
   {
    "@type": "Command",
    "name": "ActivateWorkflowLogging",
    "request": {
     "name": "inputParams",
     "schema": {
      "@type": "Object",
      "fields": [
        {
         "name": "workflow_ID",
         "schema": "string"
        },
        {
         "name": "logRepository_ID",
         "schema": "string"
        }
       ]
      }
     }
   },
   {
    "@type": "Command",
    "name": "DeactivateWorkflowLogging",
    "request": {
     "name": "inputParams",
     "schema": {
      "@type": "Object",
      "fields": [
        {
         "name": "workflow_ID",
         "schema": "string"
        },
```

Figure 7F

```
          {
            "name": "logRepository_ID",
            "schema": "string"
          }
        ]
      }
    }
  },
  {
    "@type": "Command",
    "name": "QueryLog",
    "request": {
      "name": "inputParams",
      "schema": {
        "@type": "Object",
        "fields": [
          {
            "name": "logRepository_ID",
            "schema": "string"
          },
          {
            "name": "workflow_ID",
            "schema": "string"
          },
          {
            "name": "start",
            "schema": "dateTime"
          },
          {
            "name": "end",
            "schema": "dateTime"
          }
        ]
      }
    },
    "response": {
      "name": "logEntryList",
      "schema": "dtmi:com:example:Cmd_orchestrator:LogEntryList;1"
    }
  }
  ]
}
```

Figure 7G

COMMAND ORCHESTRATION FOR DIGITAL TWIN MODELS

FIELD OF THE INVENTION

Embodiments of the present invention generally relate to digital twin systems and architectures. More particularly, at least some embodiments of the invention relate to systems, hardware, software, computer-readable media, and methods for orchestrating commands in digital twin systems and architectures.

BACKGROUND

A digital twin, by way of example, is a model that corresponds to a physical object or system. The digital twin is, in effect, a digital copy of the physical system. This allows the digital twin to behave like the physical system. Advantageously, the digital twin can ingest data, replicate processes, and the like. This allows the physical system as well as the performance of the physical system to be tested, predicted, monitored, and the like.

The Digital Twin Definition Language (DTDL) is a declarative language used describe models such as digital twins and can provide a blueprint for sharing knowledge. DTDL allows the description digital twins to be described uniformly. DTDL allows the elements, abilities, behaviors, and other aspects of digital twins to be defined and described.

However, there are aspects of digital twins that are not represented in DTDL. For example, although DTDL provides the concept that a digital twin has commands, there are no features or semantics in DTDL that allow dependencies among the commands to be expressed. Rather, DTDL is an open modelling language for modelling digital twins and is often used as a blueprint to share knowledge between vertical industries.

DTDL is based on the following main logical components: Interface, Telemetry, Property, Command, Relationship, Component, and Primitive Schemas.

The Interface describes the contents (Properties, Telemetries, Commands, Relationships, or Components) of any digital twin. Interfaces are reusable and can be reused as the schema for Components in another Interface. A valid analogy from the Object Oriented programming paradigm would be a "Class".

Telemetry describes the data emitted by any physical digital twin, whether the data is a regular stream of sensor readings or a computed stream of data or an occasional error or information message.

A Property describes the read-only and read/write state of any digital twin. For example, a device serial number may be a read-only property, the desired temperature on a thermostat may be a read-write property.

A Command describes a function or operation that can be performed on any digital twin.

A Relationship describes a link to another digital twin and enables graphs of digital twins to be created.

A component enables interfaces to be composed of other interfaces. It describes the inclusion of an interface into an interface "by value". In DTDL v2, a Component cannot contain another Component.

Primitive Schemas are full sets of primitive data types and can be specified directly as the value in a schema statement in a digital twin interface.

In addition to primitive schemas, complex schemas can be created, and schemas can be created at the interface level so they can be shared by Telemetries, Properties and Commands.

Additional information regarding DTDL/DTDLv2 can be found at the following, the contents of which are incorporated by reference in their entirety:
1. https://github.com/Azure/opendigitaltwins-dtdl/blob/master/DTDL/v2/dtdlv2.md (hereinafter "//github" for convenience);
2. https://github#interface;
3. https://github#telemetry;
4. https://github#property
5. https://github#command;
6. https://github#relationship;
7. https://github#component;
8. https://github#primitive-schemas;
9. https://github#complex-schemas.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 3B discloses aspects of a schema for expressing command dependencies in a definition document;

FIGS. 7A-7G illustrate an example of a DTDL specification for a command manager digital twin.

DETAILED DESCRIPTION OF SOME EXAMPLE EMBODIMENTS

Figure 1:
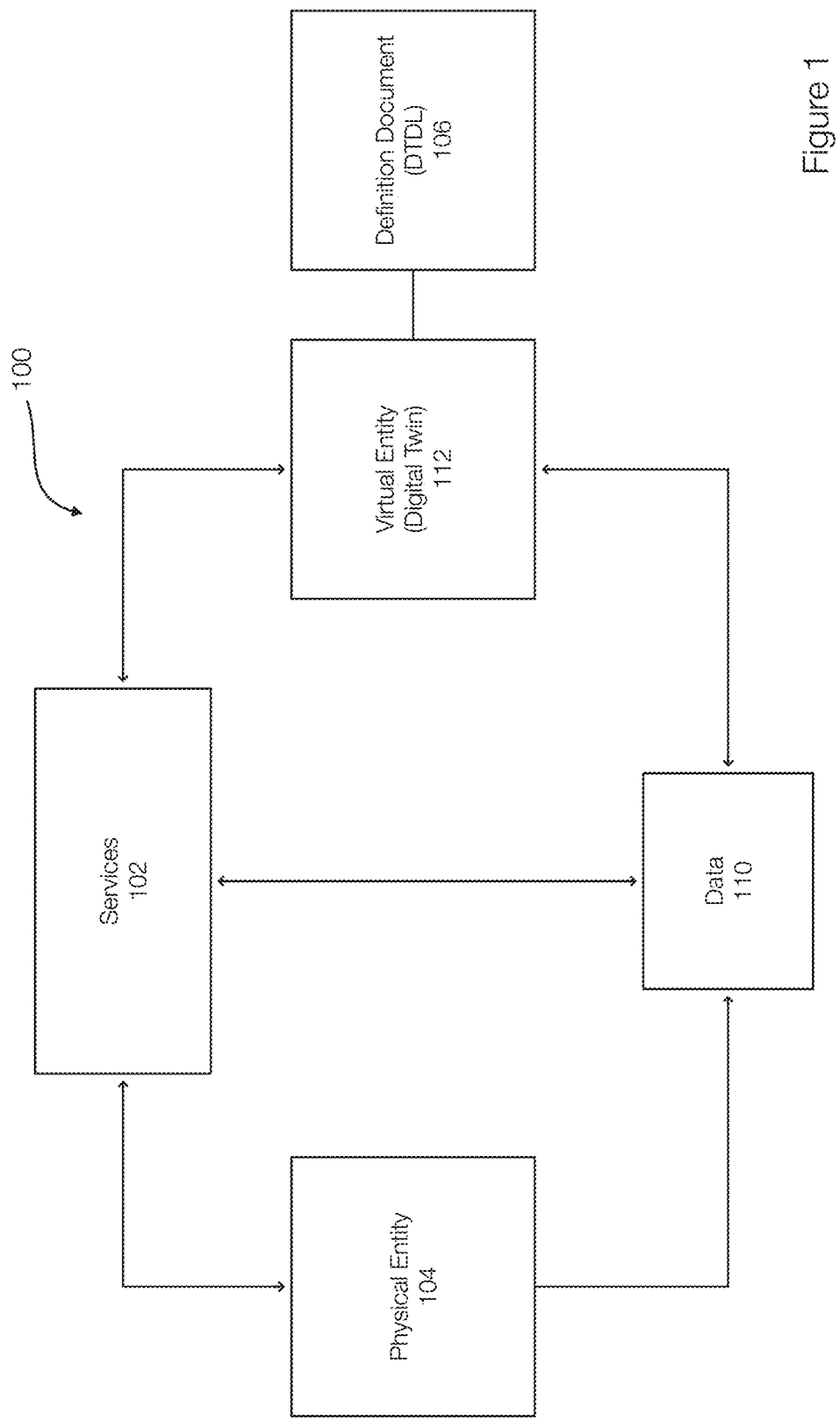
FIG. 1 discloses aspects of a digital twin system or framework.

Embodiments of the present invention generally relate to models such as digital twins and definition or declaration documents such as digital twins definition language (DTDL). More particularly, at least some embodiments of the invention relate to systems, hardware, software, computer-readable media, and methods for command orchestration in digital twins. Embodiments of the invention are described in the context of DTDL. However, embodiments of the invention are applicable to other definition/declaration languages and definition/declaration documents.

Conventionally, DTDL does not include or provide a mechanism for expressing command dependencies. Embodiments of the invention relate to a new schema through which the orchestration of commands and command dependencies can be described in DTDL, executed, and/or logged. Orchestrating commands and command dependencies may include determining how commands work together to execute workflows of commands. By way of example, a DTDL document may describe or define multiple workflows. In one example, dependent commands may constitute a workflow.

This interaction or dependencies may be described as a dependency graph, using valid DTDL elements and formation rules. The schema allows commands to be orchestrated without violating the DTDL specification and while complying with dependencies. A command manager is also disclosed that is configured read or access a DTDL document, construct workflows, execute the workflows, perform logging, and/or generate code in multiple or selected programming languages.

Orchestrating commands may also include expressing command dependencies in DTDL documents. This allows DTDL documents to accommodate workflows that may include multiple commands, which may have dependencies. The syntax/semantics of DTDL may be used to express command dependencies and allow the commands to be linked to other digital twins that may be configured to validate and/or generate the workflows.

In DTDL and by way of example, a relationship represents or defines relationships between digital twins. A relationship may represent how a first digital twin is involved or interacts with a second digital twin. Relationships may be viewed as a graph of interrelated entities. Relationships may also have properties and digital twins may have multiple relationships.

Embodiments of the invention relate to a new relationship, referred to herein as "IsOrchestratedBy". This relationship can be included in the DTDL document for the digital twin for which commands are being orchestrated and/or for the digital twin for which command dependencies are being defined. Thus, the relationship relates a digital twin to another digital twin, referred to herein as a command manager digital twin (command manager). The command manager may be specified in a different DTDL document.

The target of this relationship (IsOrchestratedBy) in the DTDL document is the DTDL Identification (ID) of the command manager. For each command that depends on the previous execution at least one other command, a relationship property is created. The relationship property includes or identifies the commands that should be executed before the command the relationship property refers to.

FIG. 1 discloses aspects of a digital twin framework or system. By way of example, a digital twin framework or system may include five dimensions: physical entity, virtual entity, services, connection, and digital data. The digital twin system 100 include a physical entity 104. The physical entity 104 may include or represent various systems, subsystems and sensory devices, such as, but not limited to, a dynamic system, a control system, a hydraulic system, sensors, design, manufacturing, or the like. The virtual entity 112 (the digital twin) may be a mirror of the physical entity 104 and may include geometry models, physics models, behavior models, rule models, or the like or combination thereof.

The services 102 are configured to ensure that the physical entity 104 operates as expected and sustains high-fidelity of the virtual entity 112 through model parameters calibration. For the physical entity 104, the services 102 may include monitoring, state prediction, optimization, or the like. For the virtual entity 112, the services may include construction services, calibration services, test service models, and the like. The connections represent possible connections, which may be bidirectional, between the services 102, the physical entity 104, the virtual entity 112, and data 110. The data 110 may be a database that stores data from the physical entity 104, the virtual entity 112, from services 102, and fusions or combinations thereof.

The virtual entity 112 may be defined by a definition document 106, an example of which is a DTDL document. The definition document 106, in accordance with embodiments of the invention, may express or include command dependencies.

As previously indicated, conventional definition documents for digital twin systems or architectures, such as DTDL documents, do not allow command dependencies to be expressed or executed. Embodiments of the invention thus relate to definition documents, including DTDL documents, that allow command dependencies to be expressed, generated, and/or executed. Embodiments of the invention improve the description of the digital twin's functionality and also include automatically generating code to express complex behaviors represented or defined by the command dependencies in the relationship. Embodiments of the invention more specifically relate to a new relationship and/or schema that is compatible with DTDL and/or other definitional languages.

Figure 2:
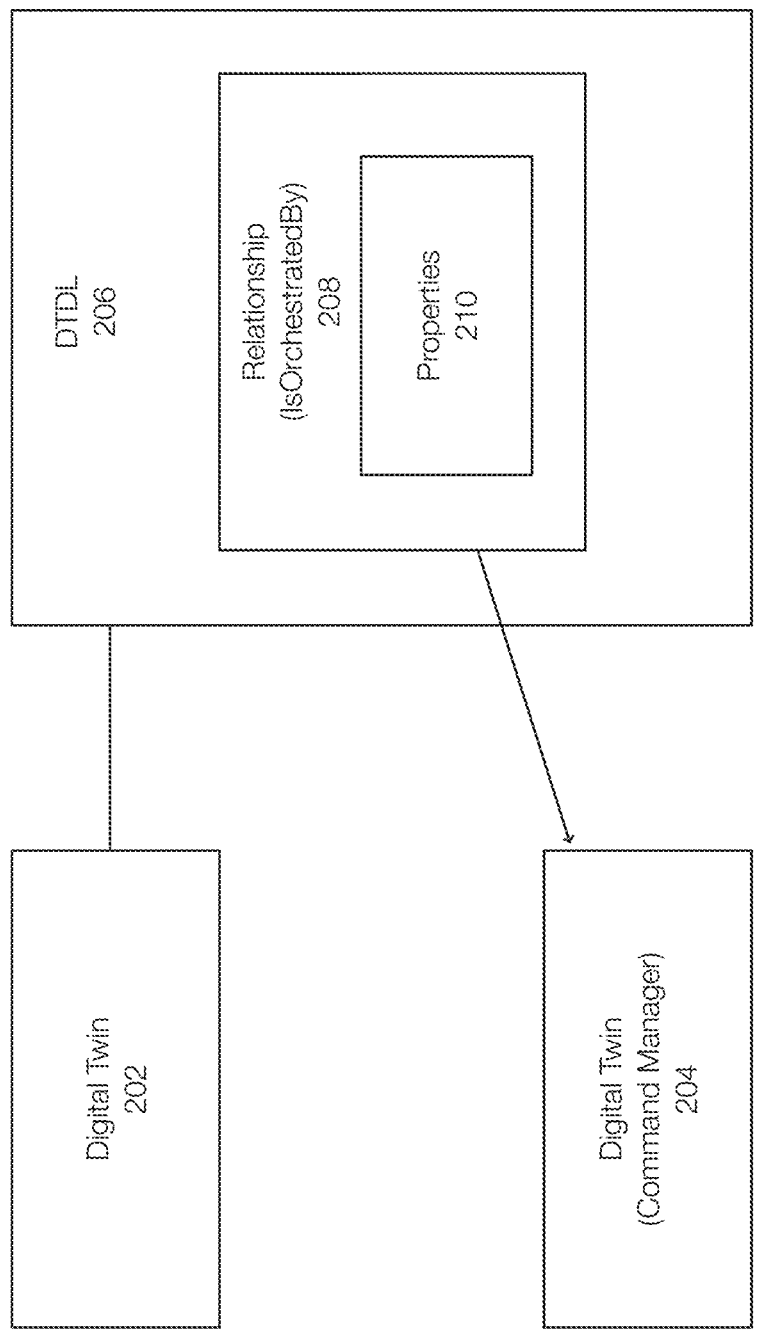
FIG. 2 discloses aspects of a schema for expressing command dependencies in a definition document.

FIG. 2 discloses aspects of a relationship or schema for expressing command dependencies that is compatible with definition languages such as DTDL. FIG. 2 illustrates a digital twin 202 that is defined by DTDL 206. The DTDL 206 includes a relationship 208 (e.g., IsOrchestratedBy) that includes properties 210. The properties 210 may identify commands of the digital twin 202 and may define or describe command dependencies for the commands of the digital twin 202. The target of the relationship 208 is a digital twin 204, which may be a command manager.

Figure 3A:
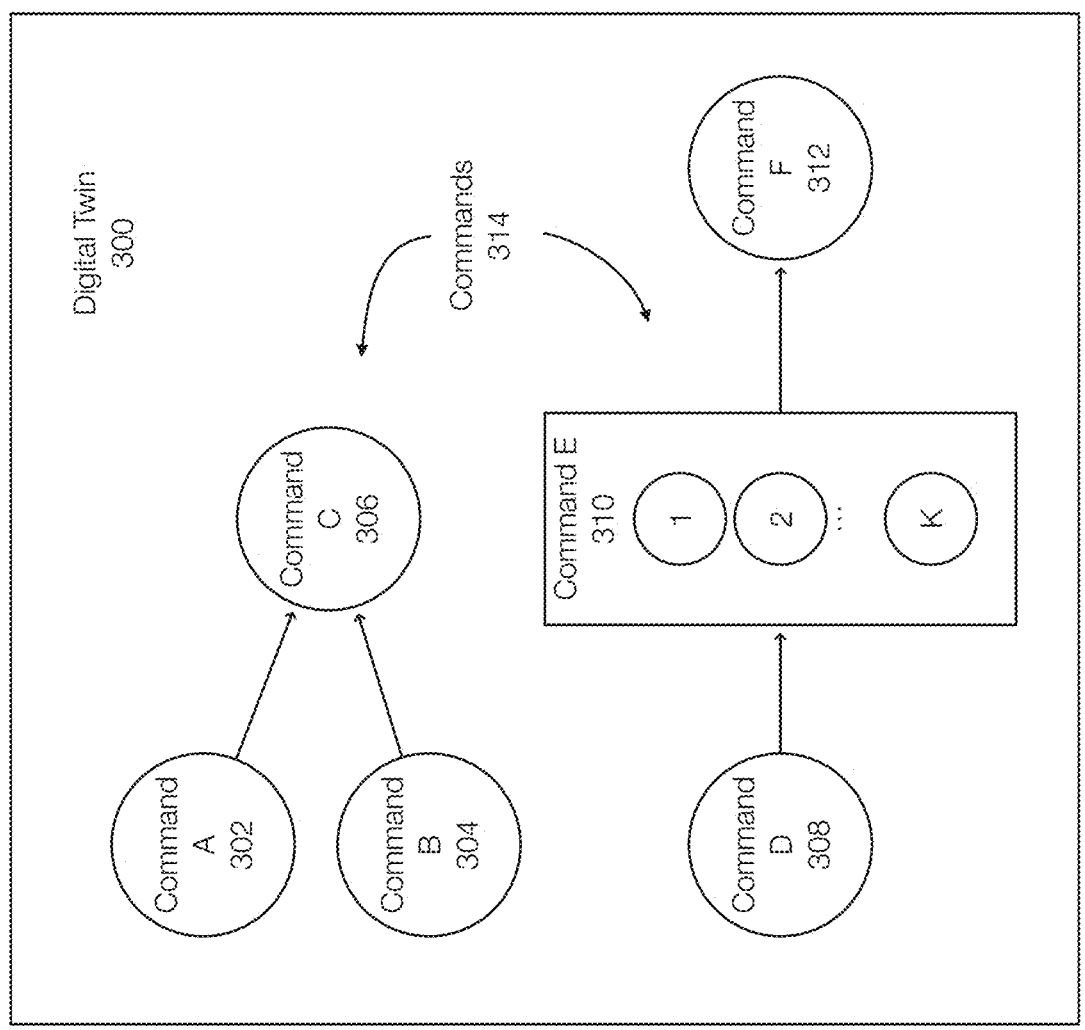
FIG. 3A discloses aspects of commands associated with a digital twin.

FIG. 3A discloses aspects of commands associated with a digital twin. The digital twin 300 may be associated with or include six commands 314, illustrated as commands 302, 304, 306, 308, 310, and 312 (also referred to herein as or command A (cmd_a), command B (cmd_b), command C (cmd_c), command D (cmd_d), command E (cmd_e), and command F (cmd_f)). The dependencies of the commands 314 are illustrated in FIG. 3A. Thus, the commands 302 and 304 are executed or finished prior to starting the command 306. In this example, the command 308 has a dependency on the commands 302 and 304. The command 312 is dependent on the command 310. The command 310 is dependent on the command 308.

FIG. 3B discloses aspects a schema for expressing command dependencies in a definition document such as a DTDL document. The document 320 in FIG. 3B is only a portion of a full DTDL document for a digital twin. In FIG. 3B, the command dependencies are integrated into the document 320 without violating the DTDL language. FIG. 3B illustrates an example of a relevant portion of a DTDL document 320. In this example, some parentheticals and other portions are omitted for convenience of illustration.

In the example, the document 320 includes annotations (referenced as annotations [1]-[10]) to illustrate the command dependency schema that enables command dependencies to be expressed in the document 320. The document 320 thus illustrates an example of expressing command dependencies in a relationship (IsOrchestratedBy). Other aspects of a DTDL document, such as telemetries, are omitted as previously stated.

The relationship 322 is declared at [1] in the document 320. The name of the relationship is "IsOrchestratedBy" and the target [2] of the relationship 322 is "Cmd_orchestrator". The Cmd_orchestrator is an example of a command manager. In one example, if the target field [2] of the relationship 322 is left blank, the validation or code generation may fail. Alternatively, the relationship 322 may be ignored in the document 320.

The target field provides flexibility. For example, changing the target field or type allows a different code generator or a different version of a code generator to be used. In other words, different command managers could be targeted, each associated with different capabilities. Thus, the relationship 322 may be amended to point to different digital twins that have different capabilities, such as the ability to generate code in a particular language or a less strict parsing operation. Generally, however, the relationship 322 uses the target field [2] to point to the description or document of another digital twin that may be configured to validate the schema in the document 320, perform/orchestrate workflows, perform logging, generate programming code and/or the like.

The relationship 322 includes relationship properties 324, 326, and 238. Each of the properties 324, 326, and 328 may refer to a command that is declared elsewhere in the document 320. The relationship properties 324, 326, and 326 illustrate how command dependencies are expressed in the document 320. The property 324 includes or references command C 306 [3], command A 302 [5] and command B 304 [6]. As set forth in the property 324, dependencies are established between the commands 306, 302, and 304. The property 324 is written to express a dependency between commands A, B, and C.

More specifically, the property 324 includes a schema 330 that includes an "Enum" (enumeration) declaration [4] that includes values [5] and [6]. The values of the enum declaration [4] identify the command A 306 [5] and the command B 304 [6]. The values inside the schema 330 are different to prevent ambiguity, but not necessarily to enforce or state order of execution. However, the values or commands identified inside the schema 330 are executed prior to the command C 306. Stated differently, the enum values in the schema 330 may be an array and each entry in the array is a command that is executed prior to the command identified in the property 324. The schema 330, as a result, allows command dependencies to be expressed in the document 320. The property 322 represents the dependencies of commands 302, 304, and 306 illustrated in FIG. 3A.

The properties 326 and 328 illustrate more complex command dependencies. The schema 332 inside the property 326 depicts a FANOUT relationship between the command F 312 [7] and the command E 310 [8]. Similarly, the schema 334 inside the property 328 depicts a FANIN relationship between the command E 310 [9] and the command D 308 [10].

The property 326 illustrates that the command F 312 depends on the prior execution of the command E 310 while the property 328 illustrates that the command E 310 depends on the prior execution of the command D 308. The dependency descriptors, examples of which are FANIN and FANOUT, represent a more complex dependency pattern.

When converting to code, the FANIN dependency descriptor indicates that the command D 308 should split its output into a discrete number of outputs that can be individually referenced by the command E 310 when the command E 310 starts its execution. These outputs of the command E 310 are illustrated as outputs 1, 2, . . . k in FIG. 3A.

Because the command E 310 qualifies as a FANOUT dependency, this dependency descriptor suggests that the command E 310 may start running several instances. When all instances are completed, the output may be a single object that can be used as input to the command F 312.

FIGS. 3A and 3B illustrate an example of simple command dependencies and more complex command dependencies or complex command patterns. These command dependencies can be implemented in various other ways, which may depend on various factors such as a choice of persistent or transient storage and mechanisms for implementing asynchrony.

Different implementations of the command manager may take care of these choices and their tradeoffs. For instance, in one implementation, a command manager may validate only full FANIN-FANOUT dependency graphs and require that consistent input and output sections in the DTDL command specification be specified, in conformity with the pattern. The command dependencies may be enforced in a manner where one of the output results of a FANIN command be the number of individual outputs it has created. This allows the command that is waiting for the FANIN command to finish to decide upon running one or more instances of itself.

In another implementation, a command manager may allow partial dependencies, i.e., only FANIN or FANOUT dependencies, and does not check if only full FANIN-FANOUT patterns are described in the DTDL document.

As illustrated in FIGS. 3A and 3B, the dependency descriptor allows complex patterns to be expressed in a declarative manner in a definition document such as a DTDL document.

Command Manager Digital Twin or Command Manager

Embodiments of the invention further relate to a command manager that is configured to work in conjunction with the new schema (e.g., IsOrchestratedBy relationship and relationship properties) described and illustrated with respect to least FIGS. 3A and 3B. The command manager is disclosed by way of example and other components or modules or models may be configured to interpret the command dependencies described herein using other internal representations and/or interfaces. In one example, the module or component or other software used by used to orchestrate the commands is represented in the value of the target field of the IsOrchestratedBy relationship. In one example, the target field may point to a command manager.

The command manager may be configured to validate the command dependencies identified in the DTDL document, generate code interfaces to create, start, stop, and reset workflows according to the descriptions provided in the relationship (e.g., the IsOrchestratedBy relationship), and/or allow for logging workflow operations. An example of a DTDL document for the Command Manager is illustrated in FIGS. 7A-7G.

In one example, describing the command manager in DTDL allows the description or specification to tailor a code generator to generate code in any arbitrary Object Oriented (OO) language. In one example, the code generator will generate the structural aspects that are available on the DTDL (e.g., the logical architecture). Additional code may need to be generated in one example.

More specifically, the command manager is configured to create a declaration of OO Classes, of their properties and fields, as well as the functions/methods declarations. The specific logic, i.e., the actual definition of the functions/methods may be provided by a developer. This gives freedom to select different implementations of the workflow innerworkings while making the responsibility of these classes clear. This facilitates reusability of the DTDL specification.

A workflow instance can be internally built according to several mechanisms provided by the various programming languages. Moreover, embodiments of the invention implement a code generator capable of expressing the Command Manager DTDL specification on an OO programming language.

Figure 4A:
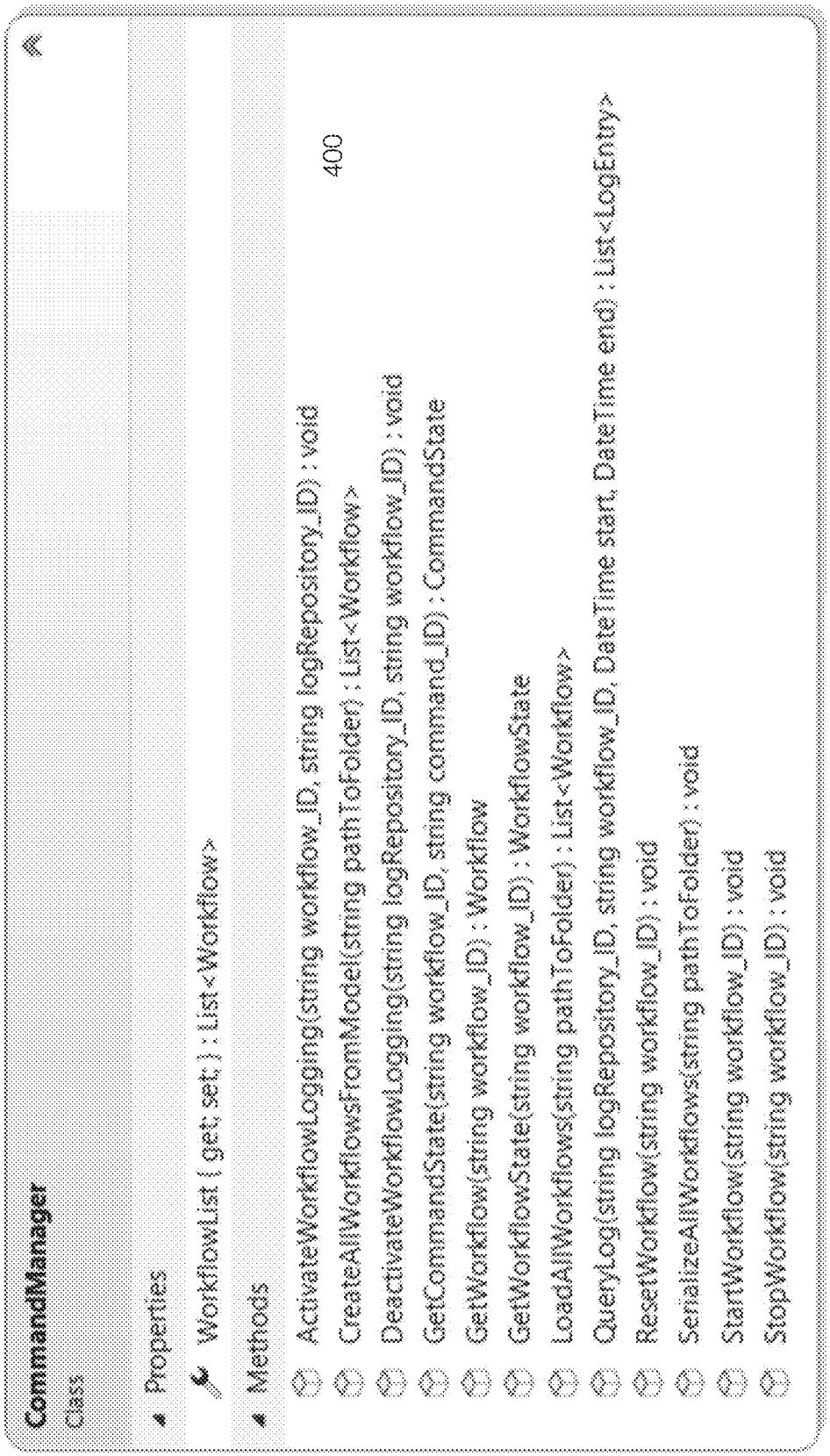
FIG. 4A illustrates example method declarations of a command manager that can be generated using a DTDL or other definition document.

FIG. 4A discloses example OO method declarations of the command manager, which can be generated by the DTDL specification illustrated in FIGS. 7A-7G. The functions and methods 400 are declared command manager class of FIG. 4A.

Figures 4B, 4C:
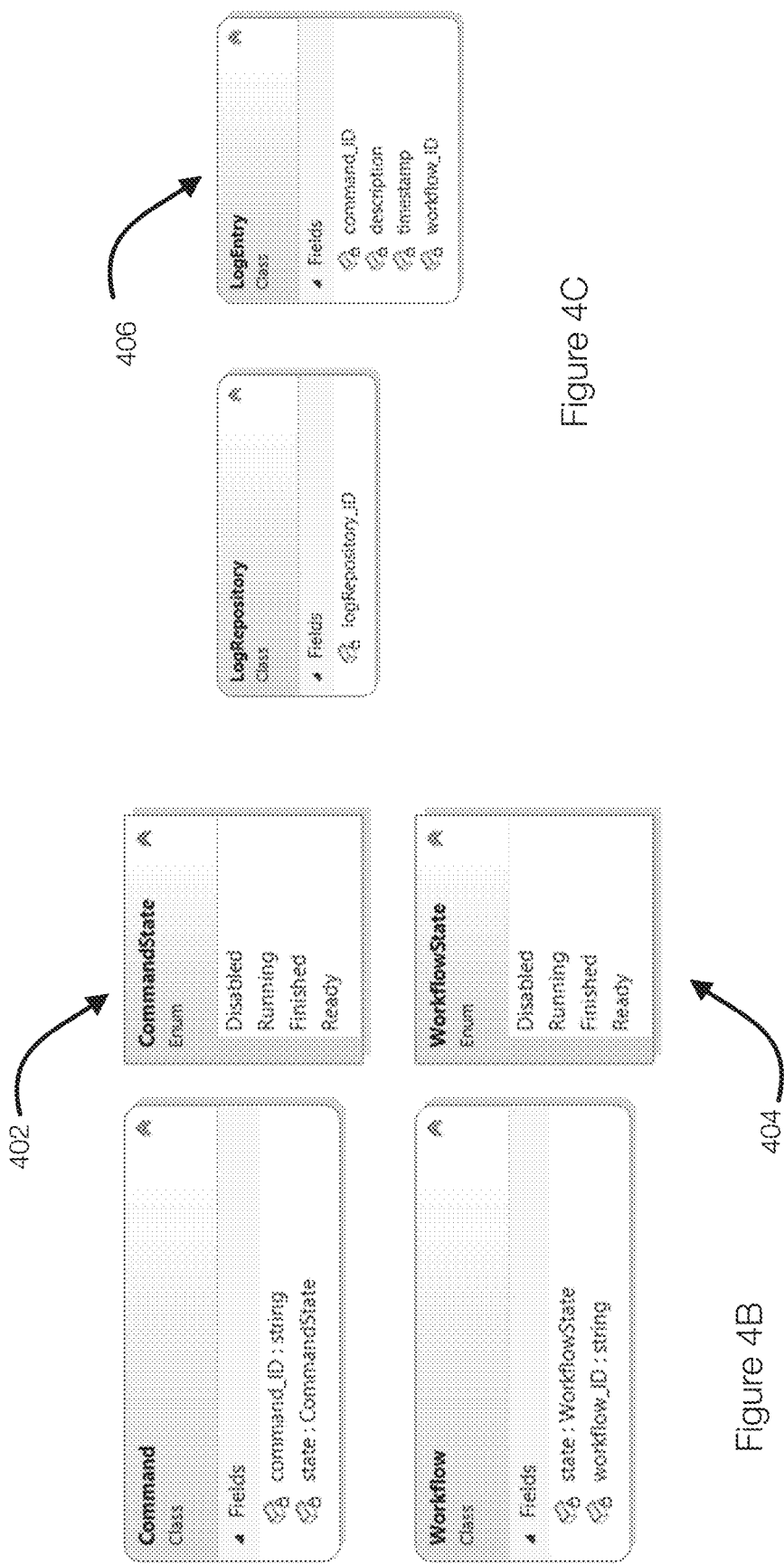
FIG. 4B discloses aspects of command state and workflow state definitions.
FIG. 4C discloses aspects of the logging functionalities of the command manager.

FIG. 4B discloses aspects of workflow state and command state definitions. The command states 402 may be used by the command manager to control the execution of a workflow or more specifically of a command.

For example, a ready state informs the command manager that a given command is ready to be executed. When the command manager starts a command, the state of the command is changed to running. When the command finishes executing, the state of the command is changed to finished. Once the state of a command is finished, other commands that are dependent on its execution can be started. A disabled state indicates that a command cannot be put into execution unless some action changes its state to ready.

The workflow states 404 depicts examples of workflow states and is operated by the command manager. Each workflow state is a combination of the state of its commands. These workflow states can be updated in different manners. In one embodiment, however, a ready workflow state indicates that all commands of that workflow are in a ready state. A running workflow state indicates that at least one command in the workflow has a running state. A finished workflow state indicates that no command in the workflow is in a running state and that at least one command is in a finished state.

When a workflow state is set to a disabled state, disabled commands in the workflow stay disabled, ready commands in the workflow stay in a ready state, finished commands in the workflow are set to a disabled state, and running commands in the workflow are interrupted and set to a disabled state.

FIG. 4C discloses aspects of the logging functionalities of the command manager. The log entry 406 may allow various information to be provided for logging purposes for logged actions, events, or the like. For example, the description field and the timestamp fields allow activities to be logged in detail. In one example, all command state transitions and all workflow state transitions may be logged.

Figure 5:
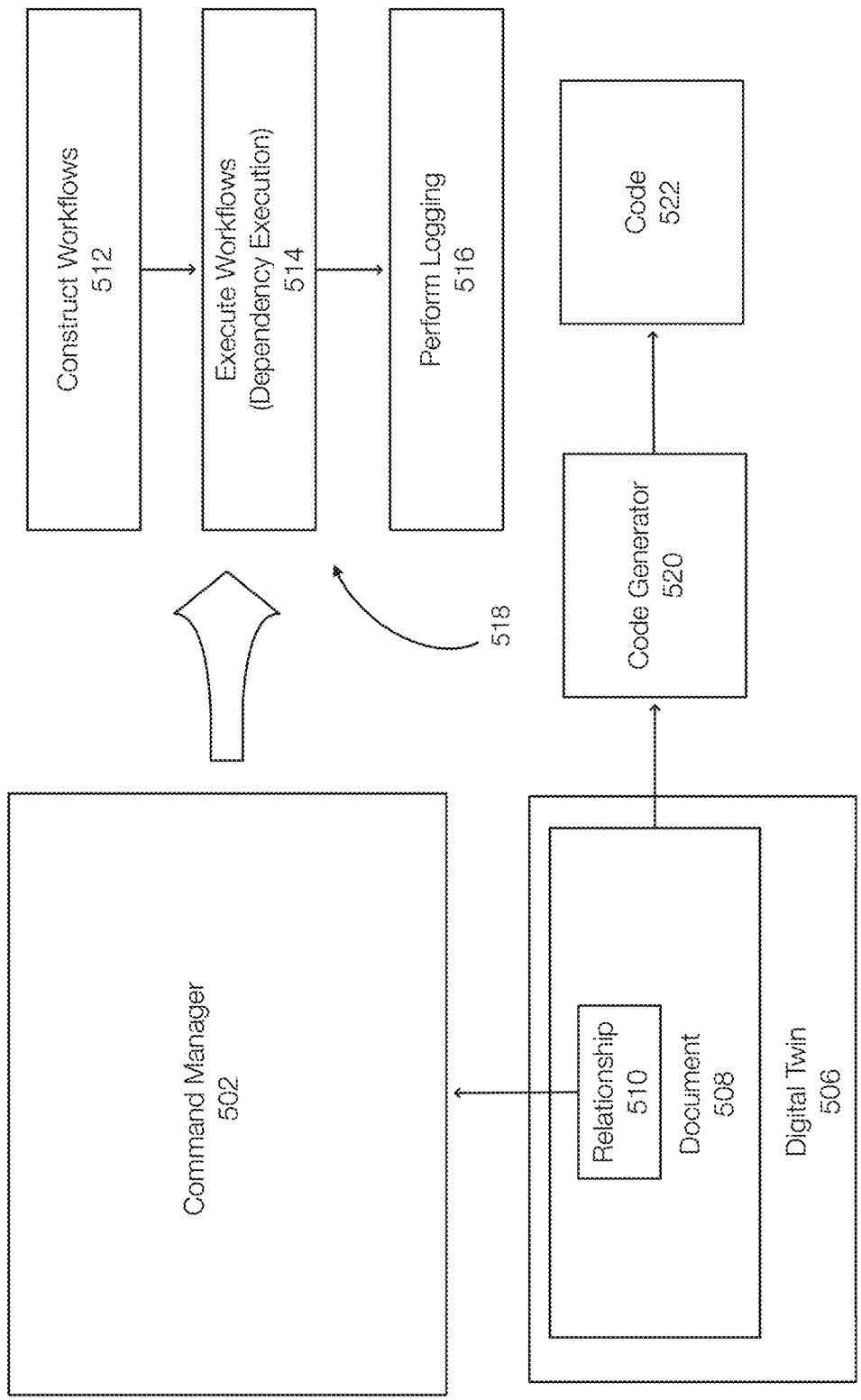
FIG. 5 discloses aspects of a command manager digital twin.

FIG. 5 discloses aspects of a command manager. The command manager 506 may be implemented as a server computer or other computing device that includes a processor, memory, networking hardware, and the like. In FIG. 5, a digital twin 506 is associated with a document 508 that includes a relationship 510 such as IsOrchestratedBy. The relationship 510 may include a target ID that points to the command manager 502. The command manager 502 is thus configured to perform responsibilities relative to the document 508 or the digital twin 506.

In one example, the responsibilities of the command manger 502 include constructions responsibilities, execution responsibilities, and logging responsibilities. The responsibilities may be performed as a method 512, which includes elements of constructing 512 workflows (construction responsibilities), executing 514 workflows (execution responsibilities), and performing 516 logging (logging responsibilities). When executing 514 workflows, the command manager 502 may implement the command dependencies expressed in the relationship 510. The command manager may also determine command states and workflow states, update the command states and the workflow states, and the like.

In one example, the responsibilities of the command manager 502 may be expressed as OO (Object Oriented) methods. When constructing 512 workflows or performing construction responsibilities, the command manager 502 may read the document 508 that includes the relationship 510. The command manager 502, after reading or otherwise accessing the document 508, may validate the DTDL code or generate OO interfaces, by way of example.

Validating the DTDL code or generating OO interfaces may include, by way of example, one or more of (these methods are illustrated in FIG. 4A):
CreateAllWorkflowsFromModel—Given DTDL models in JSON text files, create all OO workflow classes that allow for instantiation of its objects;
SerializeAllWorkflows—Given run-time instances of workflows, commands and dependencies, serialize them to JSON files;
LoadAllWorkflows—Given serialized instances of workflows and commands, create their respective instances in an execution environment; and
GetWorkflow—Obtain a running instance of a workflow, given its ID.

After constructing 512 the workflows (or workflow), the command manager 502 may execute 514 the workflows or workflow. Executing 514 the workflows includes implementing the dependency mechanisms in a runtime environment. Executing 514 the workflows may include, by way of example, one or more of (these methods are illustrated in FIG. 4A):
StartWorkflow—Starts a workflow. This includes starting the commands in the workflow which that no dependency on other commands and letting the workflow mechanism run;
StopWorkflow—Stops a Workflow from running, i.e. stopping all commands of a workflow;
ResetWorkflow—Restarts the workflow discarding any intermediate state (outputs) of the workflow;
GetWorkflowState—Gets the state of a workflow; and
GetCommandState—Gets the state of a command.

During execution of the method 518, the command manager 502 may perform 516 logging. Logging operations allows arbitrary relevant information in the context of a workflow execution (e.g., duration of each command, transition of states etc.) to be logged. A log entry may account for the lifecycle of each command, and includes a timestamp, a command ID, a workflow ID and a description as illustrated in FIG. 4C in some embodiments. Each description may contain at least the state of the command, but the description can be tailored to contain any data related to any property of the digital twin 506 where the command is declared. Performing logging may include, by way of example, one or more of (methods illustrated in FIG. 4A):
ActivateWorkflowLogging—Links the Command Manager to a Repository object and starts the logging process;

DeactivateWorkflowLogging—Stops the logging process; and

QueryLog—Given a Start Date and an End Date, get a list of log entries for a workload in a specific repository.

Embodiments of the invention further relate to generating code from a definition document (e.g., DTDL to OOPL). FIG. 5 illustrates a code generator 520 that can convert the document 508 to code 522. More specifically in one example, the code generator 520 may convert aspects of the document 508 related to commands, command execution, and/or command dependencies to code 522. Embodiments of the invention can create code in different programming languages. An example of generating code 522 from a definition document 508 such as a DTDL document is illustrated.

In one example, general rules are implemented by the code generator 520 that allow code 522 to be generated in different programming languages. The rules for generating the definition document 508, however, are distinct and independent from rules for generating the code 522 in different languages. Generating the definition document 508, for example, does not require the code to be generated. Rather, the ability to include a schema for orchestrating commands in the definition document is what allows, if desired, the code 522 to be generated automatically. The specific language may depend on the target field of the relationships. Example rules for generating OO code (e.g., code 522) from a DTDL description (e.g., document 508 or portion thereof such as a relationship) include:

1. DTDL interfaces as well as components become OO classes.
2. A DTDL Property without an ID becomes an OO field (private attribute).
3. A DTDL Property with an ID becomes an OO property (public attribute).
4. A DTDL Property with a complex Schema Object becomes a class in the scope of the DTDL interface that owns the Property. This DTDL complex schema must be declared in the section Schemas of the DTDL interface and must have an ID (see FIGS. 7A-7G for an example).
5, DTDL Telemetries become OO Properties.
6. Simple schemas map to simple types (e.g., string, integer); complex schemas, however, can be mapped to:
   a. Array->OO list
   b. Enum->OO enumeration
   c. Map->OO dictionary
   d. Object->OO class.
7. Command declarations are mapped to OO methods. The request declaration specifies the input parameter name and type, and the response declaration specifies the type returned by the method.

When generating the code 522 code and a relationship 510 (e.g., IsOrchestratedBy) is being converted or translated to code, some of these rules are changed and/or additional rules are required. Inside the "properties" section of the relationship 510, each property denotes a command that is the end of a dependency chain, i.e., a workload. The property contains an enum section where the commands that should be run before this command (the command dependencies) are named. In this case, converting the enum section of each property does not follow rule (6) above. Instead, the code validator/generator 520 scans the properties sections to build its own internal representation of the workloads. Further, if a dependency descriptor (e.g., FANIN or FANOUT, or others) appears as an "enumValue", the code generator 520 should also be able to recognize the dependency descriptor and create the dependency pattern as an internal mechanism.

As discussed herein, command dependencies indicate that some commands should be executed before others. Stated differently, the output of some commands may be input to other commands. This concept of asynchronous conveys that different methods may be called in parallel inside one method and the calling method has the ability to know when one or more of the methods finished and when to proceed with the methods that are waiting for the other methods to finish. Asynchronous programming is part of several programming language implementations.

Embodiments of the invention may also account for multiple input parameters. DTDL allows for representing inputs and outputs of a command via request and respond elements, respectively. However, the request section allows for only one element, with a specific schema, making it difficult for a command to be declared with more than one input parameter.

In one example, rules for declaring multiple input parameters include introducing a reserved keyword InputParams to be used as the value of the name of a request. Next, the schema of the request is defined as type object. The field array of the schema is used to enter the desired multiple input parameters.

Figure 6:
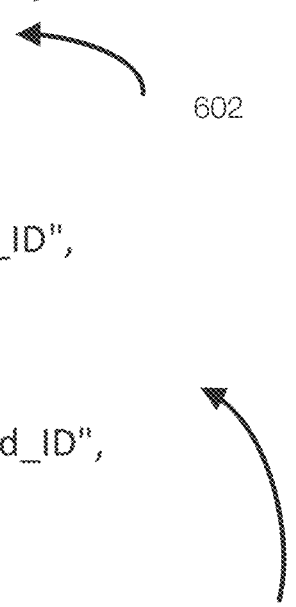
FIG. 6 discloses aspects of declaring multiple input parameters.

FIG. 6 discloses aspects of declaring multiple input parameters. In the document fragment 600, these rules are illustrated. The reserved keywork InputParams is used and a schema type object is provided, which is type object in this example. The fields are used to store the multiple input parameters.

FIG. 7A-7G illustrate an example of a DTDL specification or document for a command manager digital twin.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, digital twin operations, digital twin construction operations, digital twin orchestration operations, code generation operations, command operations, and/or command dependency operations.

In general, the scope of the invention is not limited to any particular data platform or data storage environment.

New and/or modified data collected and/or generated in connection with some embodiments, may be stored in an environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted with respect to the disclosed methods, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: accessing, by a command manager, a definition document that defines a digital twin, constructing workflows, by the command manager, based on command dependencies expressed in a relationship included in the definition document for commands declared in the definition document, and executing the command dependencies when executing the commands.

Embodiment 2. The method of embodiment 1, further comprising creating the definition document, wherein the definition document comprises a digital twin definition language document.

Embodiment 3. The method of embodiment 1 and/or 2, further comprising adding the relationship to the definition document in accordance with requirements of the definition document, wherein the relationship includes one or more properties that each correspond to a workflow.

Embodiment 4. The method of embodiment 1, 2, and/or 3, wherein the relationship includes a target field that points to the command manager, wherein the command manager comprises a digital twin.

Embodiment 5. The method of embodiment 1, 2, 3, and/or 4, wherein each of the of the one or more properties identifies a named command and each of the one or more properties includes a schema that identifies at least one command on which the named command depends.

Embodiment 6. The method of embodiment 1, 2, 3, 4, and/or 5, wherein a first property included in the one or more properties includes a dependency descriptor that describes command dependencies for commands identified within the first property.

Embodiment 7. The method of embodiment 1, 2, 3, 4, 5, and/or 6, further comprising generating code in a programming language from the definition document by a code generator, wherein code for the relationship in which the command dependencies are expressed is generated using rules that are different from rules used to generate code from other types of relationships in the definition document.

Embodiment 8. The method of embodiment 1, 2, 3, 4, 5, 6, and/or 7, further comprising performing logging by the command manager.

Embodiment 9. The method of embodiment 1, 2, 3, 4, 5, 6, 7, and/or 8, further comprising updating, by the command manager, states of the commands and states of the workflows during execution of the workflows.

Embodiment 10. The method of embodiment 1, 2, 3, 4, 5, 6, 7, 8, and/or 9, wherein the command dependencies include complex dependencies and simple dependencies.

Embodiment 11. The method as recited in any of embodiments 1-10 or in any combination therein or in any combination of any portion therein.

Embodiment 12. A system, comprising hardware and/or software, operable to perform any of the operations, methods, or processes, or any portion of any of these, or any combination thereof, disclosed herein.

Embodiment 13. A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
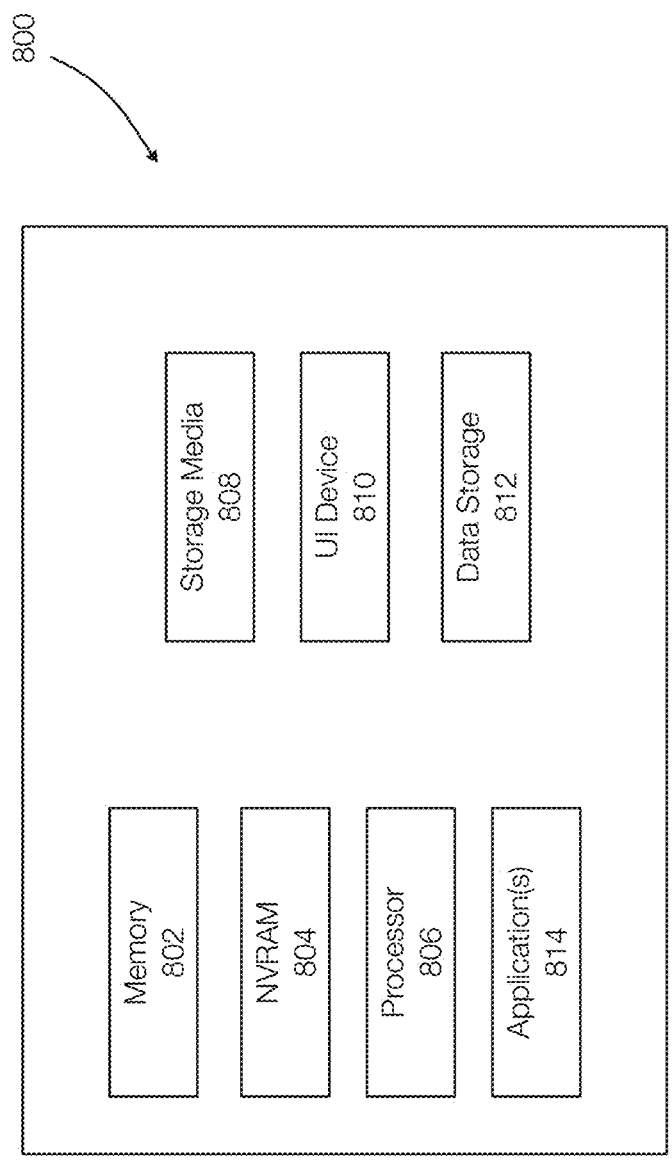
FIG. 8 discloses aspects of a computing device, system, and/or entity.

With reference briefly now to FIG. 8, any one or more of the entities disclosed, or implied, by the Figures and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random-access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid-state device (SSD) storage.

As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
accessing, by a command manager, a definition document that defines a digital twin, wherein the definition document includes a relationship that targets the command manager, wherein the relationship includes properties that define commands of the digital twin and that describe command dependencies for the commands of the digital twin;
configuring the command manager to perform responsibilities according to the relationship, wherein the command manager performs construction responsibilities and execution responsibilities;
performing the construction responsibilities by constructing workflows, by the command manager, based on the command dependencies expressed in the relationship included in the definition document for the commands declared in the definition document, wherein the workflows include an arrangement of commands of the digital twin; and
performing the execution responsibilities by executing the command dependencies when executing the commands, wherein executing the command dependencies includes implementing the command dependencies in a runtime environment.

2. The method of claim 1, further comprising creating the definition document, wherein the definition document comprises a digital twin definition language document.

3. The method of claim 1, further comprising adding the relationship to the definition document in accordance with requirements of the definition document, wherein the relationship includes the properties and each property corresponds to a workflow.

4. The method of claim 3, wherein the relationship includes a target field that points to the command manager, wherein the command manager comprises a digital twin.

5. The method of claim 3, wherein each of the properties identifies a named command and each of the properties includes a schema that identifies at least one command on which the named command depends.

6. The method of claim 5, wherein a first property included in the properties includes a dependency descriptor that describes command dependencies for commands identified within the first property.

7. The method of claim 1, further comprising generating code in a programming language from the definition document by a code generator, wherein code for the relationship in which the command dependencies are expressed is generated using rules that are different from rules used to generate code from other types of relationships in the definition document.

8. The method of claim 1, further comprising performing logging by the command manager and updating, by the command manager, states of the commands and states of the workflows during execution of the workflows.

9. The method of claim 1, wherein the command dependencies include complex dependencies and simple dependencies.

10. A non-transitory storage medium having stored therein instructions that are executable by one or more hardware processors to perform operations comprising:
  accessing, by a command manager, a definition document that defines a digital twin, wherein the definition document includes a relationship that targets the command manager, wherein the relationship includes properties that define commands of the digital twin and that describe command dependencies for the commands of the digital twin;
  configuring the command manager to perform responsibilities according to the relationship, wherein the command manager performs construction responsibilities and execution responsibilities;
  performing the construction responsibilities by constructing workflows, by the command manager, based on the command dependencies expressed in the relationship included in the definition document for the commands declared in the definition document, wherein the workflows include an arrangement of commands of the digital twin; and
  performing the execution responsibilities by executing the command dependencies when executing the commands, wherein executing the command dependencies includes implementing the command dependencies in a runtime environment.

11. The non-transitory storage medium of claim 10, further comprising creating the definition document, wherein the definition document comprises a digital twin definition language document.

12. The non-transitory storage medium of claim 10, further comprising adding the relationship to the definition document in accordance with requirements of the definition document, wherein the relationship includes the properties and each property corresponds to a workflow.

13. The non-transitory storage medium of claim 12, wherein the relationship includes a target field that points to the command manager, wherein the command manager comprises a digital twin.

14. The non-transitory storage medium of claim 12, wherein each of the properties identifies a named command and each of the properties includes a schema that identifies at least one command on which the named command depends.

15. The non-transitory storage medium of claim 14, wherein a first property included in the properties includes a dependency descriptor that describes command dependencies for commands identified within the first property.

16. The non-transitory storage medium of claim 10, further comprising generating code in a programming language from the definition document by a code generator, wherein code for the relationship in which the command dependencies are expressed is generated using rules that are different from rules used to generate code from other types of relationships in the definition document.

17. The non-transitory storage medium of claim 10, further comprising performing logging by the command manager and updating, by the command manager, states of the commands and states of the workflows during execution of the workflows.

18. The non-transitory storage medium of claim 10, wherein the command dependencies include complex dependencies and simple dependencies.

19. A method, the method comprising:
  determining command dependencies for commands in a first digital twin by accessing a definition document that defines the digital twin, wherein the definition document includes a relationship that targets a second digital twin, wherein the relationship includes properties that define commands of the first digital twin and that describe command dependencies for the commands of the first digital twin;
  configuring the second digital twin to perform responsibilities according to the relationship, wherein the second digital twin performs construction responsibilities and execution responsibilities; and
  wherein the relationship specifies the second digital twin configured, which is configured to perform the execution responsibilities by orchestrating the commands, wherein the relationship includes a property that identifies a named command and a schema that identifies the command dependencies for the named command, wherein the relationship complies with rules and elements that govern the definition document; and
  outputting the definition document.

20. The method of claim 19, further comprising generating code from the definition document, wherein rules for generating the code for the command dependencies is different from rules for generating the code for other portions of the definition document, wherein generating the code for the command dependencies includes generating an internal representation of the commands.

* * * * *